United States Patent [19]

Dai et al.

[11] Patent Number: 4,576,980

[45] Date of Patent: Mar. 18, 1986

[54] AZETIDINEDIONE COMPOUNDS AS CROSSLINKERS FOR ELECTRODEPOSITED COATINGS

[75] Inventors: Shenghong A. Dai, Wallingford; Philip W. Sherwood, Milford, both of Conn.

[73] Assignee: The Dow Chemical Company, Midland, Mich.

[21] Appl. No.: 660,768

[22] Filed: Oct. 15, 1984

[51] Int. Cl.$^4$ ................................................ C08K 3/20
[52] U.S. Cl. .................................. 523/420; 204/181.7; 523/414; 524/556; 524/591; 524/601; 524/606; 524/901; 525/454; 525/523
[58] Field of Search ................. 525/454, 523; 524/901, 524/591, 556, 601, 606; 528/116, 113, 73; 204/181 C; 523/414, 418, 420

[56] References Cited

U.S. PATENT DOCUMENTS

| | | | |
|---|---|---|---|
| 3,799,854 | 3/1974 | Jerabek | 204/181 |
| 3,925,181 | 12/1975 | McGinniss | 204/181 |
| 3,947,339 | 3/1976 | Jerabeck et al. | 204/181 |
| 3,975,251 | 8/1976 | McGinniss | 204/181 |

*Primary Examiner*—Theodore E. Pertilla
*Attorney, Agent, or Firm*—J. S. Rose

[57] ABSTRACT

Novel coating compositions are disclosed which comprise aqueous dispersions of polyamine resins in the form of their acid salts along with azetidinedione crosslinking agents and other optional adjuvants.

The compositions give rise to improved methods for the electrodeposition of heat-curable films on substrates.

The compositions and methods find particular utility in the cathodic deposition of coatings and films on automotive parts and household appliances.

15 Claims, No Drawings

AZETIDINEDIONE COMPOUNDS AS CROSSLINKERS FOR ELECTRODEPOSITED COATINGS

BACKGROUND OF THE INVENTION

1. Field of the Invention

This invention relates to aqueous dispersions for forming heat-curable films and is more particularly concerned with aqueous dispersions comprising amine containing polymers and azetidinedione crosslinking agents, and an improved process for the electrodeposition of said dispersions.

2. Description of the Prior Art

The use of aqueous dispersions for the preparation of coatings, particularly in the field of electrodeposited coatings, is well-known in the art. Cathodic electrodeposition in particular is being widely employed for the coating of such items as automobile bodies and household appliances.

Prominent amongst the coating resins used for cathodic electrodeposition are amine or polyamine containing resins wherein the amine groups are in the form of their acid salts, or quaternary salts and hydroxides. In these cationically charged forms, the resins form solubilized aqueous dispersions usually accompanied by some type of crosslinking agent and when subjected to a direct current in an electrocoating bath they migrate to the cathode which serves as the item to be coated. There the resins and crosslinking agents are uniformly deposited. The result is a heat-curable type of film on the cathode substrate which is thermally converted to the cured coating or film. When the amines are in the form of their acid salts, upon deposition at the cathode they are neutralized and deposited in free base form. Accordingly, when the amines are either primary or secondary they become available in the deposited heat-curable film for various types of curing reactions.

A typical method for cathodically electrocoating solubilized polyamine containing resins is that disclosed in U.S. Pat. No. 3,799,854 wherein the crosslinking agent is a blocked polyisocyanate. At elevated temperatures the polyisocyanate becomes unblocked and reacts with the free amine groups to form ureas.

Another typical method involving the electrodeposition of polyamine resins is that disclosed in U.S. Pat. No. 3,925,181. The crosslinking agent employed is a bis-maleimide wherein the free amines add to the beta-carbon atom of the α,β-unsaturation of the maleimide thereby effecting a cure of the resin. In a related procedure in U.S. Pat. No. 3,975,251 the crosslinking agent used to cure polyamine resins is one having at least two α,β-ethylenically unsaturated carbonyl groups (for example, ethylene glycol diacrylate).

In yet another method disclosed in U.S. Pat. No. 3,947,339 wherein blocked polyisocyanates serve as the curing agent, the solubilized amine containing resins also have hydroxyl groups for crosslinking with the isocyanate groups.

We have now discovered coating compositions in aqueous dispersions which employ the prior art primary and secondary amine containing resins in combination with a class of azetidinedione containing crosslinking agents.

The present aqueous dispersions have good storage stability even at elevated temperatures.

Furthermore, the present aqueous dispersions lead to improved methods for electrodepositing the compositions to form heat-curable films on cathodic substrates. No by-products are formed in the curing process and the temperatures required to effect the cure of the deposited films are, generally speaking, below those required previously.

SUMMARY OF THE INVENTION

The invention comprises a coating composition in aqueous dispersion for forming a heat curable film on a substrate said composition comprising:

1. a polymer having amine groups selected from the group consisting of primary amines, secondary amines, and mixtures thereof, said amine groups being in the form of their acid salts; and
2. a crosslinking agent having at least two azetidinedione groups of the formula

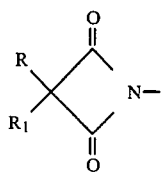

wherein R and R₁ when taken separately are independently selected from the group consisting of hydrogen and hydrocarbyl, and when R and R₁ are taken together with the carbon atom to which they are joined represent a cycloalkane having 4 to 8 ring carbon atoms, inclusive, said azetidinedione crosslinking agent being present in at least an equivalent amount to react with substantially all of said amine groups.

The invention also comprises a substrate coated with a heat cured film derived from the above described coating composition.

The invention also comprises an improved process for preparing a substrate coated with a heat cured film which comprises employing the above described coating composition for electrodepositing a heat-curable film upon a cathode substrate disposed within an electrocoating bath and thereafter heating said substrate and heat-curable film to cure said film.

The invention also comprises polymethylene poly(phenyl azetidinediones) having the formula:

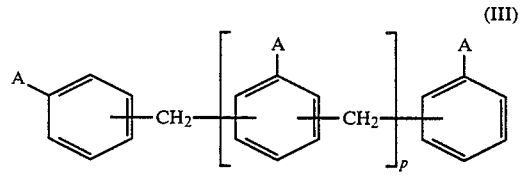

(III)

wherein A represents the azetidinedione group having the formula

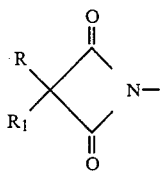

wherein R and R₁ are defined as above, and p represents an integer from 1 to 8, inclusive, or in the case of a mixture p has a mean value greater than 0 but less than 1.

The term "substrate" in its broadest scope means any surface which is coated with the compositions in accordance with the invention and is inclusive of such materials as metal, wood, fiberboard, plastic, stone, and the like.

The term "substrate" in its narrower scope as applied to electrodeposited coatings in accordance with the present invention means any electrically conducting material which can serve as a cathode, particularly metals such as steel, aluminum, copper, galvanized steel, zinc, and the like.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such a cyclobutyl, cyclopentyl, cyclohexyl, cycloheptyl, cyclooctyl and the like, including isomeric forms thereof; and cylcoalkenyl such as cyclopentenyl, cyclohexenyl, cycloheptenyl, cyclooctenyl, and the like, including isomeric forms thereof.

The hydrocarbyl groups which form the groups R, $R_1$ can be substituted by one or a plurality of inert substituents. The term "inert substituent" means inert under the conditions of the electrodeposition process and does not otherwise interfere with the ingredients of the coating composition or the crosslinking process. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

Illustrative of the term "cycloalkane having 4 to 8 ring carbon atoms" are cyclobutane, 3-methylcyclobutane, cyclopentane, 3-methylcyclopentane, cyclohexane, 3-methylcyclohexane, 4-methylcyclohexane, cycloheptane, 4-methylcycloheptane, cyclooctane, 5-methylcyclooctane, and the like.

DETAILED DESCRIPTION OF THE INVENTION

The coating compositions in accordance with the present invention are simply prepared by rapidly mixing together the polymer containing the amine groups and the crosslinking agent in an aqueous solution of an acid to form an aqueous dispersion or emulsion of said ingredients. The amine groups in the polymer are thereby neutralized to form their acid salts. In a preferred embodiment the amine groups are first neutralized with the acid prior to being mixed with the crosslinking agent, followed by emulsification into water. The neutralization of the polymer by the acid serves two purposes. It renders the polymer partially water soluble so that dispersions or emulsions can be formed and it results in the electrophoretic transfer of the polymer to a cathode when the compositions are used for electrodeposition (discussed below).

Although not essential, it is preferred that sufficient acid be employed either beforehand or during the preparation of the dispersion to neutralize substantially all of the amine groups. In a preferred embodiment, the acid component is employed in essentially stoichiometric proportions in respect of the amine content of the polymer component. That is to say, the ratio of equivalents of acid to equivalents of amine is about 1:1. The amine equivalent weight of the polymer is defined as its mole weight divided by the number of primary and/or secondary amine groups present. Any proton donating organic or inorganic acid can be employed. Illustratively, acids such as hydrochloric, sulfuric, phosphoric, formic, acetic, and lactic can be used. Preferably, the acids employed are organic acids.

The concentration of the polymer and crosslinking agent, expressed as their combined resin solids weight in the aqueous dispersion is in no way critical and can vary widely depending on such factors as the type of polymer, its molecular weight, its ability to disperse and solubilize in the water, and the like. Advantageously the dispersions can contain from about 1 to about 25 percent by weight solids, preferably from about 10 to about 15 percent by weight.

The novelty in the present compositions resides in the crosslinking agents employed. As noted above they must have at least two azetidinedione groups defined above. In the curing process, the amine groups on the polymer react with the azetidinedione to-form a malonamide linkage and thus the crosslinking.

A preferred group of azetidinedione compounds are set forth below under the formulae I to V.

I. Bisazetidinediones

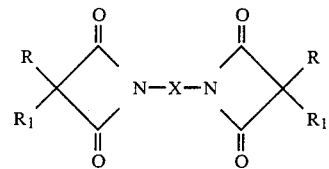

wherein R and $R_1$ are defined as above, X is selected from the group consisting of lower-alkylene, cycloalkylene, arylene, and divalent radicals having the formula

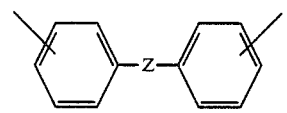

wherein Z is selected from the group consisting of —CO—, —O—, —$SO_2$—, and alkylene having 1 to 4 carbon atoms, inclusive.

The term "lower-alkylene" means alkylene having 1 to 8 carbon atoms, inclusive, such as methylene, ethylene, propylene, butylene, pentylene, hexylene, heptylene, octylene, and isomeric forms thereof. The term "cycloalkylene" means cycloalkylene having 5 to 6 carbon atoms, inclusive, such as 1,3-cyclopentylene, 1,3-cyclohexylene, 1,4-cyclohexylene, and the like. The term "arylene" means arylene having 6 to 18 carbon atoms, inclusive, such as phenylene, tolylene, napthylene, diphenylylene, and the like.

Illustrative but not limiting of the azetidinedione compounds are 1,2-bis(3,3-dimethyl-2,4-dioxoazetidino)ethane, 1,4-bis(3,3-dimethyl-2,4-dioxoazetidino)butane, 1,6-bis(3,3-dimethyl-2,4-dioxoazetidino)hexane, 1,2-bis(3-methyl-3-benzyl-2,4-dioxoazetidino)ethane, 1,2-bis(3-methyl-3-phenyl-2,4-dioxoazetidino)ethane, 1,2-bis(3-methyl-3-cyclohexyl-2,4-dioxo-azetidino)ethane, 1,4-bis(3-methyl-3-allyl-2,4-dioxo-azetidino)butane, 1,4-bis(3-methyl-3-phenyl-2,4-dioxo-azetidino)butane, 1,6-bis(3-methyl-3-butyl-2,4-dioxo-azetidino)hexane, 1,6-bis(3-benzyl- 3-phenyl-2,4-dioxo-azetidino)hexane, 1,6-bis(3,3-diethyl-2,4-dioxo-azetidino)hexane, and the like; 1,3-bis(3-methyl-3-phenyl-2,4-dioxo-azetidino)cyclopentane, 1,4-bis(3,3-dimethyl-2,4-dioxo-azetidino)cyclohexane, 1,4-bis(3-p-chlorobenzyl-3-phenyl-2,4-dioxo-azetidino)cyclohexane, and the like; 1,4-bis(2,4-dioxo-azetidino)-benzene, 1,4-bis(3,3-dimethyl-2,4-dioxo-azetidino)benzene, 1,4-bis(3,3-diethyl-2,4-dioxo-azetidino)benzene, 1,4-bis(3-ethyl-3-butyl-2,4-dioxo-azetidino)benzene, 1,3-bis(3,3-dimethyl-2,4-dioxo-azetidino)benzene, 1,3-bis(3-ethyl-3-butyl-2,4-dioxo-azetidino)benzene, 1,3-bis(3,3-dimethyl-2,4-dioxo-azetidino)-2-methyl- and -6-methylbenzene and mixtures thereof, 1,3-bis(3,3-diethyl-2,4-dioxo-azetidino)-2-methyl- and -6-methylbenzene and mixtures thereof, 1,3-bis(3-ethyl-3-butyl-2,4-dioxoazetidino)-2-methyl- and -6-methylbenzene and mixtures thereof, 1,3-bis(3,3-dibutyl-2,4-dioxo-azetidino)-2-methyl- and -6-methylbenzene and mixtures thereof, 1,3-bis(3-methyl-3-phenyl-2,4-dioxo-azetidino)-2-methyl- and -6-methylbenzene and mixtures thereof, 1,3-bis(3-methyl-3-cyclohexyl-2,4-dioxo-azetidino)-2-methyl- and -6-methylbenzene and mixtures thereof, 1,3-bis(3-methyl-3-allyl-2,4-dioxo-azetidino)-2-methyl- and -6-methylbenzene and mixtures thereof, 1,3-bis(3-methyl-3-benzyl-2,4-dioxo-azetidino)-2-methyl- and -6-methylbenzene and mixtures thereof, 1,1'-methylenebis[4-(2,4-dioxo-azetidino)benzene], 1,1'-methylenebis[4-(3,3-dimethyl-2,4-dioxo-azetidino)benzene], 1,1'-methylenebis[4-(3,3-diethyl-2,4-dioxoazetidino)benzene], 1,1'-methylenebis[4-(3,3-dipropyl-2,4-dioxo-azetidino)benzene], 1,1'-methylenebis[4-(3,3-dibutyl-2,4-dioxo-azetidino)benzene], 1,1'-methylenebis[4-(3-ethyl-3-butyl-2,4-dioxo-azetidino)benzene], 1,1'-methylenebis[4-(3-methyl-3-phenyl-2,4-dioxo-azetidino)benzene], 1,1'-methylenebis[4-(3-methyl-3-benzyl-2,4-dioxo-azetidino)benzene], 1,1'-methylenebis[4-(3,3-tetramethylene-2,4-dioxo-azetidino)benzene], 1,1'-methylenebis[ 4-(3,3-pentamethylene-2,4-dioxo-azetidino)benzene], 1,1'-carbonylbis[4-(3,3-dimethyl-2,4-dioxoazetidino)benzene], 1,1'-carbonylbis[4-(3-ethyl-3-butyl2,4-dioxo-azetidino)-benzene], 1,1'-oxybis[4-(3,3-dimethyl-2,4-dioxo-azetidino)benzene],1,1'-oxybis[4-(3-ethyl-3-butyl-2,4-dioxo-azetidino)benzene], and the like.

The bis-azetidinediones (I) are known compounds and are readily prepared using the procedures set forth in U.S. Pat. No. 3,265,684 wherein the appropriately substituted acid chlorides are reacted with the appropriate isocyanate in the presence of tertiary amines to form the azetidinediones. Using the appropriate diisocyanates and 2 molar proportions of the acid chlorides provides the diazetidinediones. The teaching of the above patent is incorporated herein by reference.

Alternatively, the azetidinediones can be prepared by the reaction of the appropriately substituted ketene and mono- or diisocyanate as disclosed by Martin et al in J. Organic Chemistry 36, 1971, p 2205 et seq. Yet another preparative method involves the reaction of the appropriate amine with the appropriately substituted malonyl chloride in accordance with the method of Ebnöther et al, Helvetica Chemica Acta 42, 1959, pp 918 to 955.

II. Azetidinedione-isocyanurates

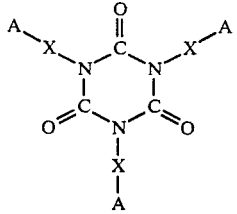

wherein X is defined as above and A represents the azetidinedione group

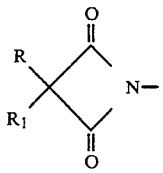

wherein R and R₁ are defined as above.

The azetidinedione-isocyanurates which are the subject of copending application Ser. No. 608,005 filed May 7, 1984,are easily prepared by trimerizing isocyanato-azetidinediones having the formula

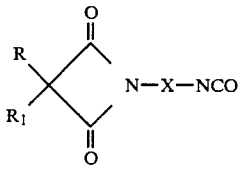

wherein R, R₁ and X are defined as above.

The trimerization process is carried out using any of the methods and techniques well-known to those skilled in the art; for illustrative methods see Saunders and Frisch, Polyurethanes Chemistry and Technology, Part I, 1962, pp. 94 to 95, Interscience Publishers, New York, N.Y. and U.S. Pat. Nos. 2,979,485; 2,993,870; and 3,381,008 whose patent disclosures are incorporated herein by reference.

Illustrative but not limiting of the isocyanatoazetidinediones which can be trimerized to the corresponding azetidinedione-isocyanurates (II) are N-(6-isocyanatohexyl)azetidine-2,4-dione, N-(6-isocyanatohexyl)-3,3-dimethylazetidine-2,4-dione, N-(6-isocyanatohexyl)-3,3-diethylazetidine-2,4-dione, N-(6-isocyanatohexyl)-3-ethyl-3-butylazetidine-2,4-dione, N-(6-isocyanatohexyl)-3-methyl-3-allylazetidine-2,4-dione, N-(6-isocyanatohexyl)-3-benzylazetidine-2,4-dione, N-(6-isocyanatohexyl)-3-phenylazetidine-2,4-dione, N-(6-isocyanatohexyl)-3,3-pentamethyleneazetidine-2,4-dione, N-(3-isocyanatocyclopentyl)-3,3-dimethylazetidine2,4-dione, N-(4-isocyanatocyclohexyl)-3,3-dimethylazetidine-2,4-dione, N-(4-isocyanatocyclohexyl)-3-ethyl- 3-butylazetidine-2,4-dione, N-(4-isocyanato-phenyl)-3,3-dimethylazetidine-2,4-dione, N-(4-isocyanatophenyl)-3,3-dibutylazetidine-2,4-dione, N-(4-isocyanatophenyl)-3-ethyl-3-butylazetidine-2,4-dione, N-(3-isocyanato-4-methylphenyl)-3,3-dimethylazetidine-2,4-dione, N-(3-isocyanato-4-methylphenyl)-3,3-diethylazetidine-2,4-dione, N-(3-isocyanato-4-methylphenyl)-3-ethyl-3-butylazetidine-2,4-dione, N-(3-isocyanato-6-methylphenyl)-3,3-dimethylazetidine-2,4-dione, N-(3-isocyanato-6-methylphenyl)-3-ethyl-3-butylazetidine-2,4-dione, N-(2-methyl-3-isocyanatophenyl)-3,3-dimethylazetidine-2,4-dione, N-(2-methyl-3-isocyanatophenyl)-3,3-diethylazetidine-2,4-dione, N-(2-methyl-3-isocyanatophenyl)-3-ethyl-3-butylazetidine-2,4-dione, 4-isocyanato-4'-(3,3-dimethyl-2,4-dioxo-azetidino)diphenylmethane, 4-isocyanato-4'-(3,3-diethyl-2,4-dioxo-azetidino)diphenylmethane, 4-isocyanato-4'-(3,3-dipropyl-2,4-dioxo-azetidino)diphenylmethane, 4-isocyanato-4'-(3-ethyl-3-butyl-2,4-dioxo-azetidino)diphenylmethane, 4-isocyanato-4'-(3-benzyl-2,4-dioxo-azetidino)diphenylmethane, 4-isocyanato-4'-(3-phenyl-2,4-dioxo-azetidino)diphenylmethane, 4-isocyanato-4'-(3,3-pentamethylene-2,4-dioxo-azetidino)diphenylmethane, and the like.

III Polymethylene poly(phenyl azetidinediones)

The polyazetidinediones having the formula (III) defined above are prepared by a process which is analogous to that known in the art. Illustratively, the compounds can be prepared using a procedure analogous to that set forth in U.S. Pat. No. 3,265,684 according to the following equation:

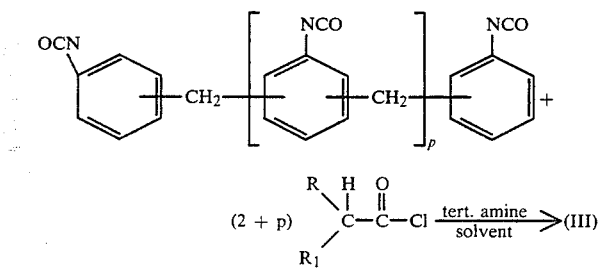

The appropriately substituted acid chloride (bromide, iodide, or fluoride can also be used), having the R and $R_1$ groups corresponding to those defined above, are well known and readily available compounds.

The polyisocyanates employed are the well-known polymethylene poly(phenyl isocyanates) which are available in a wide variety of isomer mixtures and monomeric and oligomeric forms. They are obtained by phosgenation of mixtures of the corresponding methylenebridged polyphenylpolyamines. The latter, in turn, are obtained by interaction of formaldehyde, hydrochloric acid, and aniline using procedures well-known in the art; see, for example, U.S. Pat. Nos. 2,683,730, 2,950,263, and 3,012,008. The polymethylene poly(phenyl isocyanates), generally speaking can contain from about 20 to about 90 percent by weight of methylenebis(phenyl isocyanates) with the remainder being polymethylene poly(phenyl isocyanates) of functionality higher than 2. The overall functionality of any particular mixture is, of course, directly related to the proportions of the various polymethylene poly(phenyl isocyanates) in the mixture. Accordingly, in the mixtures the value of p has a mean value greater than 0 but less than 1.

The individual components of the mixture corresponding to the above formula wherein p has the individual values of 1 to 8, inclusive, can be obtained from the mixtures by vacuum distillation, crystallization, and other conventional separation methods. These individual polyisocyanates can be employed in the preparation of (III).

Furthermore, the individual polyisocyanate components or mixtures thereof can include the 4,4'-, 2,4'- and 2,2'-isomers and various mixtures thereof. Obviously, the particular form of the starting polyisocyanate employed in the reaction with the acid chloride will dictate the isomer mixtures and the value of p in the polyazetidinedione compounds (III).

The proportions in which the acid halide and polyisocyanate are reacted together are not critical but are preferably at least in equivalent proportions. That is to say, at least 2+p moles of the acid chloride are employed for every molar amount of polyisocyanate wherein p has the same significance as the value of p in the formula of the polyisocyanate. Most preferably the acid chloride is employed in an excess amount.

The reaction is carried out by heating the reactants together in an inert organic solvent at a temperature of at least about 75° C. in the presence of an acid halide acceptor, preferably, a tertiary organic amine such as triethyl amine, tributyl amine, pyridine, and the like. The term "inert organic solvent" means an organic solvent which does not interact with the reactants or the product or otherwise interfere with the reaction. Illustrative of the solvents which can be employed are aromatic solvents such as toluene, xylene, nitrobenzene, chlorobenzene, dichlorobenzene, and the like; aliphatic and alicyclic hydrocarbons such as hexane, heptane, isooctane, cyclohexane and the like; ethers such as dibutyl ether, dipropyl ether, and the like.

The progress and completion of the reaction can be easily monitored by conventional analytical procedures such as infrared spectroscopy, nuclear magnetic resonance and the like analytical procedures.

Generally speaking, the hydrohalide salt of the tertiary amine precipitates from solution and is readily removed by filtration. The solvent is then removed by conventional methods such as distillation either at atmospheric or reduced pressure to yield the product. The latter is generally obtained as an oil which can be further purified, if desired, by routine procedures, such as chromatography, or trituration with non-solvents such as aliphatic alcohols (i.e. methanol, ethanol, isopropanol, and the like).

The azetidinedione groups (A) on the aromatic rings can be any one of the azetidinedione groups specifically exemplified above for the bis-azetidinediones (I) and for the azetidinedione-isocyanurates (II).

IV. Azetidinedione-urethanes

wherein A and X are defined as above, $R_2$ is the residue of a polyhydroxy compound having a molecular weight of from about 60 to about 3000, and a functionality m of from 2 to 6.

The azetidinedione-urethanes which are the subject of copending application Ser. No. 608,005, filed May 7, 1984 are easily prepared from the reaction of any of the isocyanato-azetidinediones described and exemplified above with the polyols having the formula $R_2(OH)_m$ and using the appropriate stoichiometric proportions of the isocyanate to react with substantially all of the hydroxyl functionality. Any of the well-known procedures in the art for reacting isocyanate compounds with polyols to form polyurethanes can be employed. For detailed methods and illustrative techniques for polyurethane preparation see Saunders and Frisch, Polyurethanes Chemistry and Technology, Part I cited supra and also Part II of the same series.

The polyols can be any of the primary and secondary hydroxyl containing compounds having the functionality and molecular weight set forth above. A preferable hydroxyl functionality is from 2 to 3.

A preferred class of polyhydric alcohols are the low molecular weight alkylene glycols, i.e. ethylene glycol, 1,4-butanediol, 1,5-pentanediol, 1,6-hexanediol, diethylene glycol, and the like and the polyalkyleneoxy glycols of MW range of about 200 to about 2000 such as polyethyleneoxy glycols, polypropyleneoxy glycols, polyethyleneoxy-polypropyleneoxy glycols, and polytetramethyleneoxy glycols.

V. Azetidinedione prepolymers as statistical mixtures with f having the average values between 0 and 1 and thus when m exceeds 2 branching occurs.

The reaction of the polyol or polyamine is carried out at elevated temperature (about 60° C.–180° C.) generally without the need for a solvent.

The preferred polymeric polyols and polyamines for the preparation of the prepolymers fall within a molecular weight range of from about 600 to about 4000. Also, the preferred value for m is 2 to 3.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example, those derived from butanediol with diarylcarbonates; polyester amides, the resole polyols (see

wherein A, X, R, and $R_1$ are defined as above, $R_3$ is the residue of a polyhydroxy or polyamino compound having a molecular weight of from about 400 to about 8000 and a functionality m of from 2 to 6, Y represents —O— when said $R_3$ is the residue of a polyhydroxy compound and —NH— when said $R_3$ is the residue of a polyamino compound, f has an average value between 0 and 1, and D represents a branch unit when the functionality of said polyhydroxy or polyamino compound exceeds 2.

The azetidinedione prepolymers which are the subject of copending application Ser. No. 608,004, filed May 7, 1984 are easily prepared by reacting any of the bis-azetidinedione compounds (I) described and exemplified above with a polyol or polyamine having the formula

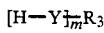

wherein $R_3$, Y, and m are defined as above. The number of moles of bisazetidinedione employed per mole of the $[HY]_m R_3$ is substantially equivalent to the value of m.

The term "branch unit" in respect of D means the unit having the formula

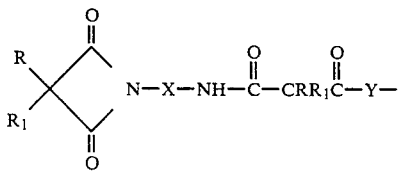

wherein R, $R_1$, X, and Y are defined as above. When m=2 then there are no branch units and D disappears from the formulae. When m is greater than 2 but the value of f is 0, then here again there would be no branch units. However, the prepolymers are generally obtained Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

Illustrative but not limiting of the polyamines which can be used are the primary amine terminated polyether resins made from an appropriate initiator to which lower alkylene oxides such as ethylene oxide, propylene oxide, butylene oxide, or mixtures thereof are added with the resulting hydroxyl terminated polyol then being aminated. When two or more oxides are used they may be present as random mixtures or blocks of one or the other polyether. If ethylene oxide is used it is desirable to cap the hydroxyl terminated polyol with a small amount of higher alkylene oxide to ensure that the terminal hydroxyls are essentially secondary, and, thus more easily replaced by —$NH_2$ groups.

A preferred group of polyols comprises the polypropyleneoxy-polyethyleneoxy capped diols obtained by the alkoxylation of water, ethylene glycol, propylene glycol, aniline, and the like; the polyester diols obtained from the reaction of dibasic carboxylic acids such as succinic, adipic, suberic, azelaic, phthalic and isophthalic acids, and the like, with alkylene glycols and oxyalkylene glycols to form the corresponding polyalkylene, and polyoxyalkylene ester diols or copolymers thereof.

A preferred group of polyamines for the preparation of (V) are the polyoxyethylene and polyoxypropylene diamines having a molecular weight of from about 600 to about 2000.

The cross-linking agents described above are employed in at least an equivalent amount to react with substantially all of the amine groups present in the coating composition. The equivalent weight of the azetidinedione materials is defined as their mole weight divided by the number of azetidinedione groups present. Advantageously, the ratio of equivalents of curing agent to equivalents of amine polymer is about 1:1.

The polymer containing the amine groups can be any of the polyamines having primary or secondary amine groups or mixtures thereof disclosed in the prior art for use in coatings and, particularly, coatings for electrodeposition purposes. Typical of such polymers are those disclosed in U.S. Pat. Nos. 3,799,854; 3,925,181; 3,975,251; and 3,947,339 whose disclosures relative thereto are incorporated herein by reference. The molecular weight can vary over wide limits depending on the type of polymer and the amine functionality. Generally speaking, the range can be from about 400 to about 100,000, preferably from about 600 to about 25,000, most preferably from about 600 to about 4000.

The amine groups can be attached terminally or pendantly or both types in the same polymer. That is to say, if they are connected as end groups on a linear chain, this defines terminal amines. When the connection is at some other site such as along the polymer chain or on a pendant side chain, this defines pendant amines. Although both primary and secondary amine groups are both useful in the present compositions, it is the primary amines which result in the faster curing to a film and to this extent the primary amine groups are preferred.

In respect of the amine functionality per se the polymer must have at least two amine groups. Generally speaking, the higher the amine functionality, the higher the degree of crosslinking and the harder the film that is formed from the composition. However, if functionality is too high, then the film properties begin to fall off and film brittleness becomes a problem.

Advantageously, the amine functionality is from about 2 to about 8, preferably from about 2 to about 6. This includes mean values falling between 2 and 6 due to the presence of mixtures of polyamines of differing functionality.

The base resins or polymers which carry the amine groups are represented by a wide variety of polymer classes as disclosed in the patent references incorporated herein by reference. Typical of the polymers are epoxy resins such as epoxy modified diglycidyl ethers of bisphenol A, glycidyl ether adducts of aliphatic polyethylene or polypropylene glycols, glycidyl ethers of phenolic resins or polyphenols, acrylic and vinyl type resins, polyester resins, polyamides derived from the condensation of dimerized fatty acids with aliphatic polyamines such as ethylene diamine and diethylene triamine, polyurethanes, and the like. Also included within the scope of the present invention are the primary amine terminated polyether resins discussed above in regard to the preparation of the azetidinedione-prepolymers (V) and as exemplified by the Jeffamine polyoxypropylene and polyoxyethylene diamines supplied by Texaco Chemical Co.

A typical method for incorporating amine functionality in resins is through the use of ketimine derivatives of polyamines as illustratively disclosed in U.S. Pat. No. 3,947,339 already incorporated herein by reference. Depending on the type of polyamine used to prepare the ketimine, single or polyamine groups can be introduced at reactive sites on the base polymer. For example, the ketimine derived from N-methyl-1,3-propanediamine and methyl isobutyl ketone can be reacted through its secondary amine group with the epoxy groups in epoxy resins, or an isocaynate terminated polyurethane and thereby be grafted onto the respective polymers. Subsequent hydrolysis of the ketimine group yields the free amine terminated resin. Similarly, the use of a ketimine derived from diethylenetriamine will result in the introduction of two primary amines at the one grafting site.

Other optional ingredients and additives can be included in the aqueous dispersions in accordance with the present invention. Illustrative of such materials are surfactants, uv stabilizers, antioxidants, pigment compositions including iron oxides, lead oxides, strontium chromate, carbon black, titanium dioxide, talc, barium sulfate, cadmium yellow, cadmium red, chromic yellow, and the like.

The aqueous dispersions of the present invention can be employed in conventional coating applications wherein the dispersion or emulsion is applied to any type of substrate defined above by brushing, dipping, rolling, spraying, and the like. Drying under conventional conditions, for example, heating to 40° to 70° C. under atmospheric or forced draft conditions, removes the water and other volatiles to leave a heat-curable film on the substrate. The film is then cured by heating to a higher temperature. Generally speaking, heating the film from about 75° to about 175° C., and preferably, from about 100° to about 150° C. will provide the substrate with the cured film.

A preferred embodiment for the use of the present compositions leads to an improved process for the electrodeposition of a heat-curable film upon an electrically conducting substrate which serves as the cathode in an electrocoating bath. Further, the substrate can be in the shape of bars, sheets, irregularly shaped forms with rounded or sharp edges, and still the deposition of the film will be uniform throughout.

The actual electrodeposition process and the various types of electrocoating baths and conditions which can be employed are well-known in the prior art. For typical methods and teaching see the U. S. patents whose disclosures are already incorporated herein by reference. Suffice it to say that upon passage of the direct current between an anode and the cathode substrate, the polyamine salt and crosslinking agent electrophoretically migrate to the cathode. At the cathode, the amine salt is neutralized to the free amine and the polymer and crosslinking agent form an adherent film upon the substrate cathode.

The applied voltage can be greatly varied being as low as one volt or as high as 1000 volts. Advantageously, the voltage employed will be between 25 and 500 volts, preferably 50 to 300 volts. The time of deposition will vary depending on such factors as the actual surface area to be coated, the bath conductivity, charge density of the resin, and the like.

The improvement in the present electrocoating process resides in the use of the azetidinedione crosslinking agents described in detail above. Firstly, the polyamine is cured by reaction with the azetidinedione rings wherein no by-products are formed. More importantly the temperatures at which the curing process is carried out are generally lower than those required by prior art methods, or, conversely, the rate at which cure is effected is faster. The curing can be carried out within the curing temperature ranges set forth above for the conventionally applied coatings.

While any of the azetidinedione materials (I) through (V) can be employed as crosslinking agents in the manner described above, preferred classes are those azetidinediones having the formulae (I) and (III).

Preferred groups within (I) and (III) both have the azetidinedione groups wherein R and $R_1$ are both lower-alkyl of $C_1$ to $C_8$, and in the case of formula (I) wherein X is arylene and a divalent radical having the formula

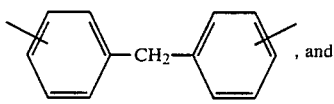, and in the case of formula (III) wherein p has a mean value greater than 0 but less than 1.

The coating compositions and improved coating methods in accordance with the present invention are useful in the preparation of metal parts including automotive parts and bodies, and household applicances coated with primers and corrosion resistant one-coat systems.

The following preparations and examples describe the manner and process of making and using the invention and set forth the best mode contemplated by the inventors for carrying out the invention but are not to be construed as limiting.

Preparation I: Lactic Acid Salt of A Primary Amine Terminated Polyurethane

A one liter flask was charged with 325 g. (1.0 equiv.) of a polytetramethylene glycol (Teracol 650, supplied by DuPont Chemical Co.) and 22.5 g. (0.25 equiv.) of an ethoxylated trimethylolpropane. The stirred mixture was thoroughly dried by heating at about 100° C. under 0.5 mm mercury pressure for about 2 hours.

The mixture was cooled to 60° C. and 224.5 g. (2.022 equiv.) of isophorone diisocyanate was added along with several drops of dibutyltin dilaurate. Under a nitrogen atmosphere, the mixture was heated to about 75° to 80° C. at which point it began to exotherm. External cooling was applied to keep the reaction temperature below 100° C. After the exotherm had subsided, the mixture was heated at 80° C. for six hours. The isocyanate terminated prepolymer was analyzed and found to have an observed isocyanate content of 5.68% (theory=5.67%); isocyanate eq. wt.=739.4.

A reaction flask was charged with 100 g. (0.135 eq.) of the above isocyanate terminated resin. The resin was heated at 80° C. during stirring and thereafter there was added dropwise to the flask 23.0 g. (0.135 mole) of the ketimine derived from the condensation of 1.0 mole of N-methyl-1,3-propanediamine and 1.0 mole of methyl isobutyl ketone. After the addition was complete, the reaction resin was neutralized with a solution of 12.2 g. (0.135 mole) of lactic acid in 20 g. of deionized water which hydrolyzed off the methyl isobutyl ketone to leave the primary amine lactic acid salt.

Thus there was obtained 0.135 equiv. of the lactic acid salt of the primary amine terminated polyurethane in a mixture containing water and methyl isobutyl ketone.

Preparation II: Lactic Acid Salt of A Diprimary Amine Terminated Polyurethane

A 100 g. (0.135 eq.) sample of the above isocyanate terminated resin was reacted in the same manner as described above but with 36.0 g. (0.135 mole) of the diketimine of diethylenetriamine and methyl isobutyl ketone. The reacted resin was neutralized with 24.3 g. (0.270 mole) of lactic acid in 20 g. of deionized water which hydrolyzed off the methyl isobutyl ketone to leave the diprimary amine lactic acid salt.

Thus there was obtained 0.270 equiv. of the lactic acid salt of the diprimary amine terminated polyurethane in a mixture containing water and methyl isobutyl ketone.

Preparation III. Lactic Acid Salt of A Diprimary Amine Terminated Polyepoxy Resin A reaction flask was charged with 100 g. (0.0564 equiv.) of an epoxy resin prepared from the reaction of epichlorohydrin and bisphenol A (GT-7097, epoxy eq. wt.=1772, supplied by Ciba-Geigy). The resin was dissolved in 100 g. of methyl isobutyl ketone by heating the ketone at reflux under a nitrogen atmosphere. The refluxing was continued to remove trace amounts of water by azeotropic distillation and removal through a trap. Fifty grams of methyl isobutyl ketone were then distilled from the reaction flask.

The dried epoxy resin was heated to about 90° C. and during stirring there was added dropwise 15 g. (0.0564 mole) of the diketimine derived from 1.0 mole of diethylenetriamine and 2.0 moles of methyl isobutyl ketone. After the ketimine addition was completed, the temperature of the mixture was increased to 120° C. where it was held for 1.5 hours. The reacted resin was neutralized with 15.0 g. (0.167 mole) of lactic acid in 25 g. of deionized water which hydrolyzed off the methyl isobutyl ketone to leave the diprimary amine lactic acid salt.

Thus there was obtained 0.113 equiv. of the lactic acid salt of the diprimary amine terminated polyepoxide resin in a mixture containing water and methyl isobutyl ketone.

EXAMPLE 1

The following experiment describes the preparation of two coating compositions in accordance with the present invention (Samples 1 and 2) and their electrodeposition on a substrate to form coatings. Sample 3, a comparison sample was also electrodeposited and its properties compared to those of 1 and 2.

To the mixture obtained as Preparation I and comprising 0.135 equiv. of the lactic acid salt of the amine terminated polyurethane along with some water and methyl isobutyl ketone (split off from the ketimine) was added a solution of 1.0 g. Foamkill 639 (a hydrocarbon oil-containing diatomaceous earth surfactant, supplied by Crucible Chemical Co.), 0.5 g. of Dow No. 57 (a silicone oil, supplied by Dow-Corning Corp.), 1.0 g. of a mixture of two uv stabilizers (0.5 g. each of Tinuvin 770 and Tinuvin 328, supplied by Ciba-Geigy Corp.), and 0.5 g. of Irganox 1076 antioxidant supplied by Ciba-Geigy Corp., all dissolved in 20 g. of ethylene glycol monobutyl ether and 10 g. of methyl ethyl ketone. Following this, 33.9 g. (0.135 equiv.) of 1,1'-methylenebis[4-(3-ethyl-3-butyl-2,4-dioxo-azetidino)-benzene] (a bis-azetidinedione according to Formula I above) was thoroughly mixed into the mixture followed by the addition of about 1000 ml. of water to form an aqueous dispersion with a resins solid content in the range of 10 to 15 percent by weight. Thus, there was produced the coating composition of Sample 1.

Sample 2 was prepared similarly to Sample 1 except that the crosslinking agent added was 35.1 g. (0.135 equiv.) of the polymethylene poly(phenyl azetidinedione) according to Formula (III) above, wherein the R and $R_1$ groups in the azetidinedione rings were ethyl- and butyl- respectively and the azetidinedione equivalent weight was 260 (viscosity=6,500,000 at 25° C.). The mean value of p was about 0.7 which indicated a di- to tri- to higher azetidinedione functionality of about 45 percent to 20 percent to 35 percent respectively. Thus there was produced the Sample 2 aqueous dispersion of about 10 to 15 percent by weight resin solids content.

Sample 3 was prepared identically to 1 and 2 except that no crosslinking agent was added.

The Samples 1 to 3 were cathodically deposited onto zinc phosphate treated steel panels measuring 3 in.×6 in. by 0.010 in. thick to form heat-curable films in the case of Samples 1 and 2. The anode was the stainless steel container used to hold the emulsion. A 50 volt e.m.f. was applied using a Raytheon direct current power supply and the deposition time was 20 seconds. The coated panels were rinsed with water and then subjected to curing in an oven at 100° C. The coatings were tested for gellation at regular intervals during the cure cycle by scratching the films with a tongue depressor while they were still hot. Gelled films were removed from the oven, allowed to cool to ambient room temperature (about 20° C.) and tested for solubility in methyl ethyl ketone (MEK). Gelled films which were found to be MEK soluble were returned to the oven for additional curing. The results of the testing and cure time are set forth in Table I below.

TABLE I

| | Time to Gel (100° C.) (hrs:mins.) | MEK Solubility/Cure Time (hrs:mins.) |
|---|---|---|
| Sample 1 | 0:30 | Sol/1:00 |
| Sample 2 | 0:15 | Insol/0:15 |
| Sample 3 | after 1:00, no gel | Sol/1:00 |

The coating of the control Sample 3 did not gel after 1 hour of curing at 100° C. and was soluble in MEK. Contrastingly, Sample 1 gelled in 30 minutes but was MEK soluble after 1 hour. Sample 2 which employed a much higher functionality curing agent gelled in 15 minutes and was MEK insoluble after the same time span.

EXAMPLE 2

The following experiment describes the preparation and electrodeposition of Sample 4, a coating composition in accordance with the present invention. The same procedure and ingredients as in Sample 1 above were employed except that 0.270 equiv. of the lactic acid salt of the diprimary amine terminated polyurethane prepared as Preparation II above was the base resin and the equivalent proportion of the 1,1'-methylenebis[4-(3-ethyl-3-butyl-2,4-dioxo-azetidino)benzene] was raised accordingly to 67.8 g. (0.270 equiv.). Thus there was produced the Sample 4 aqueous dispersion of about 10 to 15 percent by weight of resin solid content.

Sample 5, a control composition was prepared identically to Sample 4 but contained no crosslinking agent.

Both Samples 4 and 5 were cathodically deposited and subjected to heat curing using the same procedure employed in Example 1 and the results and the gel times and solubility characteristics are set forth in Table II below.

TABLE II

| | Time to Gel (100° C.) (hrs:mins.) | MEK Solubility/Cure Time (hrs:mins.) |
|---|---|---|
| Sample 4 | 0:10 | Insol./0:10 |
| Sample 5 | after 1:00, no gel | Sol./1:00 |

The control Sample 5 did not gel after 1 hour of curing at 100° C. and was MEK soluble. Sample 4 gelled in 10 minutes and was MEK insoluble at this point.

EXAMPLE 3

The following experiment describes the preparation and electrodeposition of two coating compositions (Samples 6 and 7) in accordance with the present invention.

To the mixture obtained as Preparation III above and comprising 0.113 equiv. of the lactic acid salt of the diprimary amine terminated polyepoxide mixture (including some water and methyl isobutyl ketone) was added a solution of 1.0 g. of Foamkill 639 and 0.5 g. of Dow No. 57 silicone oil dissolved in 10 g. of MEK. Following this, 28.3 g. (0.113 equiv.) of 1,1'-methylenebis[4-(3-ethyl-3-butyl-2,4-dioxo-azetidino)benzene] was thoroughly mixed into the mixture followed by the addition of about 1000 ml. of water to form Sample 6 which is an aqueous dispersion containing a resins solid content in the range of 10 to 15 percent by weight.

Sample 7 was prepared similarly to Sample 6 using all the same ingredients except that the crosslinking agent added was 29.3 g. (0.113 equiv.) of the same polymethylene poly(phenyl azetidinedione) described in Example 1 above. The resulting aqueous dispersion of Sample 7 contained about 10 to 15 percent by weight of resin solid content.

Sample 8 a comparison composition was prepared identically to Samples 6 and 7 except that no crosslinking agent was added.

The coating compositions were cathodically deposited using the same procedure and apparatus described in Example 1 except that duplicate electrodeposited panels of each sample were prepared. One set was eventually cured at the 100° C. temperature and the second set at 150° C. The results of the gel times and solubility characteristics of the coatings are set forth in Table III below.

TABLE III

| | Time to Gel (hrs:mins.) | MEK Solubility/Cure Time (hrs:mins.) |
|---|---|---|
| Sample 6 | at 100° C. cure, (N.A.)* | Insol./1:15 |
| | at 150° C. cure, 0:15 | Insol./0:15 |
| Sample 7 | at 100° C. cure, (N.A.)* | Insol./0:30 |
| | at 150° C. cure, 0:05 | Insol./0:05 |
| Sample 8 | at 100° C. cure, (N.A.)* | Sol./1:30 |
| | at 150° C. cure, 0:30 | Sol./0:30 |

*Not applicable

It should be noted that the softening point for the base epoxy resin is close to the 100° C. temperature so that the scratch test employed for determining gellation cannot be considered definitive. Therefore, the gel tests for the coatings cured at 100° C. have been marked not applicable. However, in both Samples 6 and 7 cured at 100° C. the coatings were found to be MEK insoluble at the times noted showing that the coatings were cured even though softened at that temperature level. At the higher curing temperature of 150° C. the extent of crosslinking was such that hard, infusible coatings had formed.

In the case of the control Sample 8, the coating showed gellation at 150° C. cure but was MEK soluble.

EXAMPLE 4

In order to test the stability of coating compositions in accordance with the present invention, duplicates of all the Samples 1 through 8 from the above Examples 1 to 3 were stored at room temperature (about 20° C.) for periods ranging from 2 weeks to 1 month. All of the aged compositions were electrodeposited onto the metal panels using identical electrocoating methods and curing cycles described above.

The film curing and solubility properties found for all the samples were essentially the same as the initial results set forth in Tables I to III above.

The Sample 2 which contained the polymethylene poly(phenyl azetidinedione) curing agent was tested further for stability at an elevated temperature. It was stirred and heated at 70° C. for 4 hours. The composition was cooled to room temperature then electrodeposited as described in Example 1 above.

The film curing and solubility properties had not changed from the results set forth in Table I above when compared to the control Sample 2 which had not been heated.

EXAMPLE 5

The following experiment describes the application of a coating composition in accordance with the present invention by conventional spray technique onto zinc phosphate treated steel panels to form a heat-curable film.

The compositions of Sample 4 and the control Sample 5 described in Example 2 above were sprayed onto two separate panels for each composition using conventional air atomizing spray equipment. Several coats were applied onto all four panels with the films being dried at 50° to 60° C. for about 5 minutes between coats.

After the last drying step the films were sticky to the touch and were readily MEK soluble. One set of the panels of each composition was cured at 100° C. while the other set was cured at 150° C. The gel times and solubility characteristics of the films are set forth in Table IV below.

TABLE IV

|  | Time to Gel (hrs:mins.) | MEK Solubility/Cure Time (hrs:mins.) |
|---|---|---|
| Sample 4 | at 100° C. cure, 0:45 | Insol./1:00 |
|  | at 150° C. cure, 0:05 | Insol./0:05 |
| Sample 5 | at 100° C. cure, no gel (1:15) | Sol./1:15 |
|  | at 150° C. cure, 0:10 | Insol./0:10 |

Curing of Sample 4 was effected at 100° C. but not in the case of control Sample 5. At the higher curing temperature of 150° C. Sample 4 cured in half the time it took Sample 5 to cure.

A comparison of the 100° C. cure data herein for Sample 4 with the data for the corresponding sample in Table II above shows that the electrodeposited coating cures at a much quicker rate than the spray coating.

EXAMPLE 6

A one-liter reaction flask equipped with a stirrer, reflux condenser, thermometer, and addition funnel, was charged with 27.0 g. (0.2 equiv.) of a polymethylene poly(phenyl isocyanate) mixture comprising about 45 percent by weight of methylenebis(phenyl isocyanate) and the remainder of the mixture containing polymethylene poly(phenyl isocyanates) of functionalities higher than 2. The isocyanate equivalent weight of the polyisocyanate was 137 and the average value of p was calculated to be 0.7. Along with the polyisocyanate, 40 g. (0.25 mole) of 2-ethylhexanoyl chloride was charged to the flask and the ingredients dissolved in 300 ml. of ortho-xylene. The solution was stirred and heated by an oil bath which was regulated to 125° to 140° C.

Over a 6 hour period 40 g. (0.4 mole) of triethylamine was added through the addition funnel. The heating and stirring was continued for 18 hours. An infrared analysis of an aliquot sample showed the presence of residual isocyanate groups at 2255 cm$^{-1}$.

An additional 10 g. (0.06 mole) of the acid chloride was added all at once to the reaction mixture followed by the dropwise addition of an additional 15 g. (0.15 mole) of triethylamine. The reaction solution was heated at the 125° to 140° C. bath temperature until the total reaction time was 48 hours.

The reaction solution was cooled to 0° C. and the precipitated triethylamine hydrochloride was separated by suction filtration. The filtrate was distilled under vacuum first under a pressure of about 15 mm. of mercury followed by 0.3 mm. pressure using a heating bath temperature of 80° C. Thus the solvent, excess triethylamine, and any other volatiles were removed. A residue of 68.7 g. of oil remained.

The residual oil was vigorously stirred with 60 ml. of methanol at room temperature (about 20° C.) for 30 minutes. The solution was chilled in a dry-ice cooling bath for 2 hours. An upper dark brown methanol layer was decanted and discarded. This trituration process with methanol was repeated. After the second cooled methanol layer was discarded the residue was subjected to vacuum drying (about 0.3 mm. of mercury pressure) at 80° C. for about 4 hours. The residue was 56.5 g. of a tan colored oil. Thus there was produced a polymethylene poly(phenyl azetidinedione) in accordance with the present invention and formula (III) above having the formula

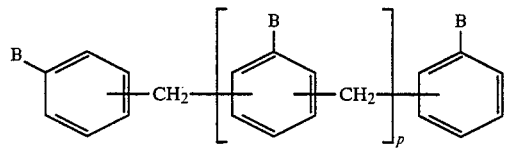

wherein B represents the group

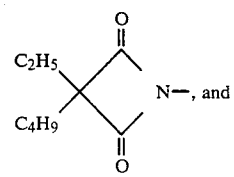

p has a mean value of about 0.7.

The infrared absorption spectrum was consistent with the above structure having the strong and weak absorption at 1740 cm$^{-1}$ and 1860 cm$^{-1}$ respectively, which are characteristic for this azetidinedione grouping. Also the nuclear magnetic resonance spectrum was consistent with the above structure. The product was formed in about 100 percent yield based on polyisocyanate.

We claim:
1. A coating composition in aqueous dispersion for forming a heat-curable film on a substrate said composition comprising
   1. a polymer having amine groups selected from the group consisting of primary amines, secondary amines, and mixtures thereof said amine groups being in the form of their acid salts; and
   2. a crosslinking agent having at least two azetidinedione groups of the formula

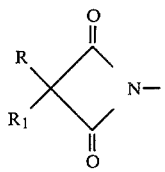

wherein R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, said azetidinedione crosslinking agent being present in at least an equivalent amount to react with substantially all of said amine groups.

2. A coating composition according to claim 1 wherein said amine groups in said polymer are primary amines.

3. A coating composition according to claim 1 wherein said azetidinedione crosslinking agent has a formula selected from the group consisting of

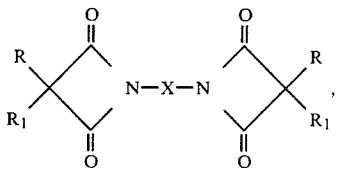  I

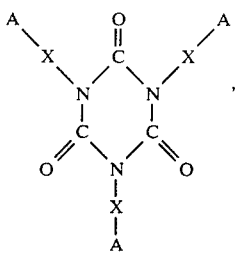  II

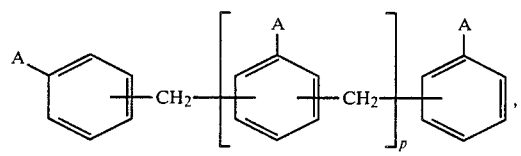  III $(AXNHCOO)_{\overline{m}}R_2$, and  IV

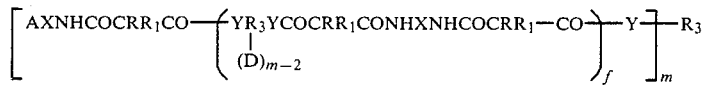  V wherein R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, X is selected from the group consisting of lower-alkylene, cycloalkylene, arylene, and divalent radicals having the formula

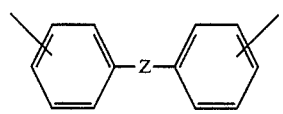

wherein Z is selected from the group consisting of —CO—, —O—, —SO$_2$—, and alkylene having 1 to 4 carbon atoms, inclusive, A represents the azetidinedione group

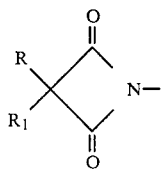

wherein R and $R_1$ are defined as above, p represents an integer from 1 to 8, inclusive, or in the case of a mixture p has a mean value greater than 0 but less than 1, $R_2$ is the residue of a polyhydroxy compound having a molecular weight of from about 60 to about 3000, and a functionality m of from 2 to 6, $R_3$ is the residue of a polyhydroxy or polyamino compound having a molecular weight of from about 400 to about 8000 and a functionality m of from 2 to 6, Y represents —O— when said $R_3$ is the residue of a polyhydroxy compound and —NH— when said $R_3$ is the residue of a polyamino compound, f has an average value between 0 and 1, and D represents a branch unit when the functionality of said polyhydroxy or polyamino compound exceeds 2.

4. A coating composition according to claim 3 wherein said azetidinedione crosslinking agent has the formula (I).

5. A coating composition according to claim 3 wherein said azetidinedione crosslinking agent has the formula (II).

6. A coating composition according to claim 3 wherein said azetidinedione crosslinking agent has the formula (III).

7. A coating composition according to claim 3 wherein said azetidinedione crosslinking agent has the formula (IV).

8. A coating composition according to claim 3 wherein said azetidinedione crosslinking agent has the formula V.

9. A coating composition according to claim 1 wherein said azetidinedione crosslinking agent has the formula

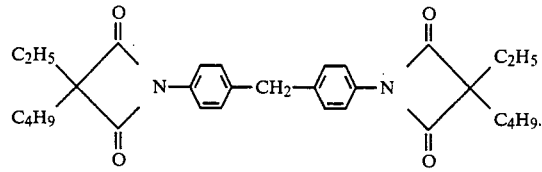

10. A coating composition according to claim 9 wherein said polymer is a polyurethane having primary amine groups in the form of the lactic acid salts thereof.

11. A coating composition according to claim 9 wherein said polymer is a polyepoxy resin having primary amine groups in the form of the lactic acid salts thereof.

12. A coating composition according to claim 1 wherein said azetidinedione crosslinking agent has the formula

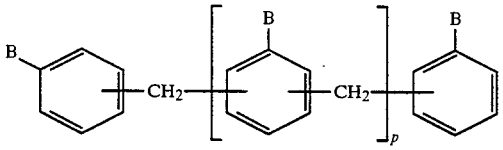

wherein p has a mean value greater than 0 but less than 1 and B represents the group

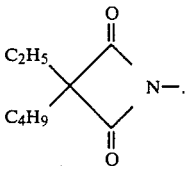

13. A coating composition according to claim 12 wherein said polymer is a polyurethane having primary amine groups in the form of the lactic acid salts thereof.

14. A coating composition according to claim 12 wherein said polymer is a polyepoxy resin having primary amine groups in the form of the lactic acid salts thereof.

15. A substrate coated with a heat cured film derived from the composition in accordance with claim 1.

* * * * *

UNITED STATES PATENT AND TRADEMARK OFFICE
CERTIFICATE OF CORRECTION

PATENT NO. : 4,576,980

DATED : March 18, 1986

INVENTOR(S) : Shenghong A. Dai and Philip W. Sherwood

It is certified that error appears in the above-identified patent and that said Letters Patent is hereby corrected as shown below:

Column 4, line 26 "Advantageously" should read
-- Advantageously, --; line 30 "composit:ons" should read
-- compositions --; line 34 "to-form" should read
-- to form --. Column 8, line 60 "(AXNHCOO )$_m$R$_2$" should read
-- (AXNHCOO$\rightarrow$)$_m$R$_2$ --. Column 9, line 52 "[HY]$_m$R$_3$" should read
-- [HY$\rightarrow$]$_m$R$_3$ --. Column 12, line 60 "More importantly" should
read -- More importantly, --. Column 20, Claim 3, lines 4-35
Roman Numerals I, II, III, IV, V, respectively, should be
inserted to the right of each of the formulas.

Signed and Sealed this

Third Day of February, 1987

*Attest:*

DONALD J. QUIGG

*Attesting Officer*         *Commissioner of Patents and Trademarks*